F. B. JOHNSON.
Grain-Drill.
No. 67,986
Patented Aug. 20. 1867.
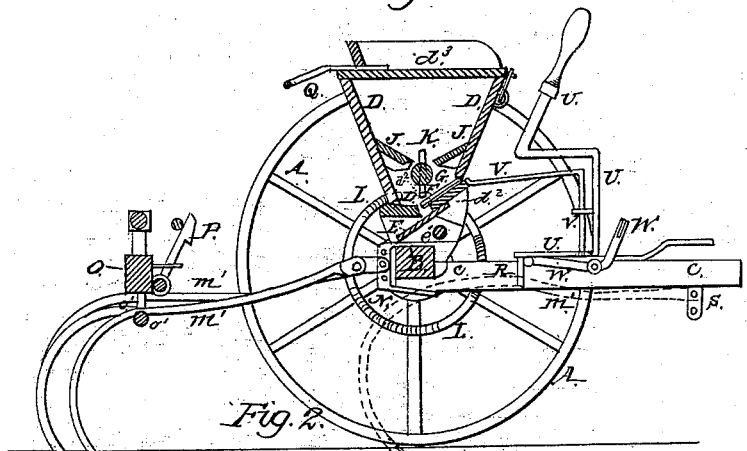

United States Patent Office.

F. B. JOHNSON, OF DE WITT, IOWA.

Letters Patent No. 67,986, dated August 20, 1867.

---

IMPROVEMENT IN SEEDER AND CULTIVATOR.

---

*The Schedule referred to in these Letters Patent and making part of the same.*

---

TO ALL WHOM IT MAY CONCERN:

Be it known that I, F. B. JOHNSON, of De Witt, in the county of Clinton, and State of Iowa, have invented a new and useful Improvement in Seeders and Cultivators; and I do hereby declare that the following is a full, clear, and exact description thereof, which will enable others skilled in the art to make and use the same, reference being had to the accompanying drawings, forming part of this specification, in which—

Figure 1 is a vertical detail section of my improved cultivator and seeder, taken through the line $xx$, fig. 2.

Figure 2 is a top view of the same, the corner being open and parts broken away to show the construction.

Similar letters of reference indicate like parts.

My invention has for its object to furnish an improved broadcast seeder, which shall be so constructed and arranged that it may be easily adjusted for use as a cultivator, and it consists in the combination of the cut-off slide with the bottom of the seed-box; in operating the slide cut-off by a bent lever pivoted to a support attached to the seed-box; in the combination of a set-screw with the operating lever, to serve as a gauge in adjusting the throw of the lever, and consequently the movement of the slide; in the agitator or stirrer, constructed as described, in combination with the seed-box, caps, and zigzag or waved wheel, attached to the wheel of the seeder; in the combination of a movable inclined seed-board with the bottom of the seed-box; in attaching the cultivator-bars in groups to each other, and to the adjustable clevises bolted to the axle of the seeder, so that any or all the cultivators may be raised or lowered, as desired; in the combination of the bar and bent guide-lever with the supporting guide-rod and with the cultivator-bars; in the combination of the lifting-lever with the guide-lever and tongue of the machine; in the combination of the lifting-bar with the cultivator-bars, and in attaching a catch to the lifting-bar to catch upon a loop attached to the seed-box, to hold the cultivator raised while passing from place to place.

A are the wheels, B is the axle, and C is the tongue of the machine. D is the seed-box, the end parts or frame of which are extended down and rigidly attached to the axle B, so as to leave a space between the bottom of the said box and the said axle for the reception of the inclined seed-board. The seed-board E may have its ends supported upon blocks $e'$, attached or pivoted to the supports of the seed-box, or its lower edge may be hinged to the rear corner of the axle B, so that it may be made to act as a cut-off. The bottom of the seed-box D is made in two parts, $d^1$ and $d^2$, with an opening or slit between them for the escape of the seed, which falls upon the inclined seed-board E, insuring its even distribution. F is the slide cut-off, which lies along the part $d^1$ of the bottom of the seed-box and is pivoted to the lower ends of the arms G, the upper ends of which are pivoted to the seed-box. If desired, the upper ends of bars G may be pivoted to the lower end of levers which are pivoted to the seed-box, and are adjustably secured in place by screws passing through slots in their T-shaped upper ends, so that the slide cut-off may be adjusted when the seed-box is full. To the projecting end of the slide F is pivoted the lower end of the bent lever H, which is pivoted to the support $h^1$ attached to the seed-box D, and the upper end of which extends up through the keeper $h^2$, into such a position that it may be reached and operated by the driver from his seat. I is a set or gauge-screw passing in through the keeper $h^2$, so that by adjusting the said screw the throw of the lever H, and consequently that of the slide F, may be regulated at pleasure, according to the rapidity with which it is desired that the seed should escape from the seed-box. J are caps, placed in the box D in an inclined position, forming a second or false bottom to said seed-box, and having an opening between them in which works the stirrer K. The stirrer K has pins passing vertically through it, and projecting equally above and below. The stirrer is placed in the space between the bottom $d^1 d^2$, and the caps J directly between the openings in said bottom and caps, as shown in fig. 1, so that as it is moved back and forth longitudinally it may prevent the seed from clogging, and may insure its regular and uniform escape. The ends of the stirrer-shaft pass out through and work in holes in the ends of the seed-box D, and a reciprocation motion is communicated to it by the zigzag or waved wheel L, upon which one end of the stirrer-shaft rides. The zigzag wheel L is securely attached to one of the wheels A of the machine, so as to revolve with the revolution of said wheel. M are the ploughs, the forward end of the beams $m'$ of which are collected into groups of threes, which are pivoted to each other. The forward end of the central beam of each group is cut off in front of the pivoting point, forming a space between the two side ends for the reception of the clevises N, three of which are attached to the axle B, one at each end and one at the centre. The clevises N have several holes formed through them, so that the adjustment of one or all the plough-beams may be regulated at pleasure. O is a lifting and guide-bar, which is connected to the plough-beams by loops or staples $o'$ attached to its under side. The end loops are short, so as to confine the end or two outer plough-beams closely to the beam O, the other loops being made longer to allow play to the said plough-beams $m'$. P is a catch, secured to the beam O by staples, in such a position that when the beam O is raised, carrying the ploughs M with it, the said catch will take hold of the loop 2, attached to the cover $d^3$ of the box, and hold the ploughs suspended while turning the machine or taking it from place to place.

When the machine is to be used as a cultivator the central plough of the central group is removed, and the side ploughs of said group carried forward, the forward ends of their beams being passed through the eyes of the bar R, and attached to the bolt or support S projecting downward from the tongue C. Several holes may be made through the support S, so that the said beams may be adjusted as desired. To the centre of the bar R is attached the lower end of the bent lever U, which is pivoted to the guide-rod V in such a way that it may partially revolve back and forth, and move up and down upon the said guide-rod. The upper end of the lever U extends up, into such a position that it may be readily reached and operated from the driver's seat to guide the ploughs, so as to avoid uneven hills. W is a lever pivoted to the side of the tongue C, the rear end of which is bent at right angles, so as to pass beneath the horizontal part of the lever U, and the forward end of which passes upward into such a position that it may be reached and operated by the driver with his foot to raise the lever U and bar R, and with them the ploughs, when desired.

Having thus described my invention, what I claim as new, and desire to secure by Letters Patent, is—

1. Operating the slide cut-off F by a bent lever, H, pivoted to a support, $h'$, attached to the seed-box D, substantially as herein shown and described and for the purpose set forth.

2. Adjusting the movement of the slide cut-off F by means of a set or gauge-screw, I, acting upon the lever H, substantially as herein shown and described and for the purpose set forth.

3. The combination of the stirrer K, constructed as described, with the seed-box D, caps J, and zigzag or waved wheel L, attached to one of the wheels A, substantially as and for the purpose herein set forth.

4. The combination of the movable inclined seed-board E with the bottom of the seed-box D, substantially as herein shown and described and for the purpose set forth.

5. Attaching the plough-beams $m'$ to each other and to the clevises N bolted to the axle B, substantially as herein shown and described and for the purpose set forth.

6. The combination of the bar R and bent lever U with the support and guide-rod V, and with the plough-beams $m'$, substantially as herein shown and described and for the purpose set forth.

7. The combination of the lifting foot-lever W with the bent guide-lever U, and with the tongue C of the machine, substantially as herein shown and described and for the purpose set forth.

8. The combination of the lifting and guide-bar O with the plough-beams $m'$, substantially as shown and described and for the purpose set forth.

9. Attaching a catch, P, to the lifting and guide-bar O, substantially as herein shown and described and for the purpose set forth The above specification of my invention signed by me this 2d day of May, 1867.

F. B. JOHNSON.

Witnesses:
ZENAS PLUMB,
F. BUCK.